United States Patent [19]

Hellegaard et al.

[11] Patent Number: 4,574,341
[45] Date of Patent: Mar. 4, 1986

[54] CURRENT SUPPLY APPARATUS FOR AN A.C. CONSUMER

[75] Inventors: Kjeld Hellegaard, Nordborg; Hans Doktor, Aarhus C, both of Denmark

[73] Assignee: Danfoss A/S, Nordborg, Denmark

[21] Appl. No.: 555,069

[22] Filed: Nov. 25, 1983

[30] Foreign Application Priority Data

Dec. 17, 1982 [DE] Fed. Rep. of Germany ....... 3246706

[51] Int. Cl.⁴ .......................................... H02H 7/122
[52] U.S. Cl. ...................................... 363/56; 363/89; 363/98
[58] Field of Search ................ 363/34, 37, 53, 56, 363/89, 97–98, 124, 132; 323/266

[56] References Cited

U.S. PATENT DOCUMENTS 4,047,081 9/1977 Liska ............................... 363/132 X
4,099,225 7/1978 Nygaard .......................... 363/98 X
4,454,573 6/1984 Petsch et al. ...................... 363/98

Primary Examiner—Peter S. Wong
Attorney, Agent, or Firm—Wayne B. Easton

[57] ABSTRACT

The invention relates to a current supply apparatus in which galvanic separation between the control portion and the high voltage portion is provided and has the feature of a rapid interruption of an overcurrent upon overload, such as, short-circuiting. Control pulses for the chopper and inverter transistor thereof are fed to a base control circuit by way of an opto-coupler and the gate feedable with an appropriate blocking signal on overcurrent is disposed between the opto-coupler and the base control circuit for the chopper and for the transistor of the inverter that are connected to the current return line of the inverter.

3 Claims, 1 Drawing Figure

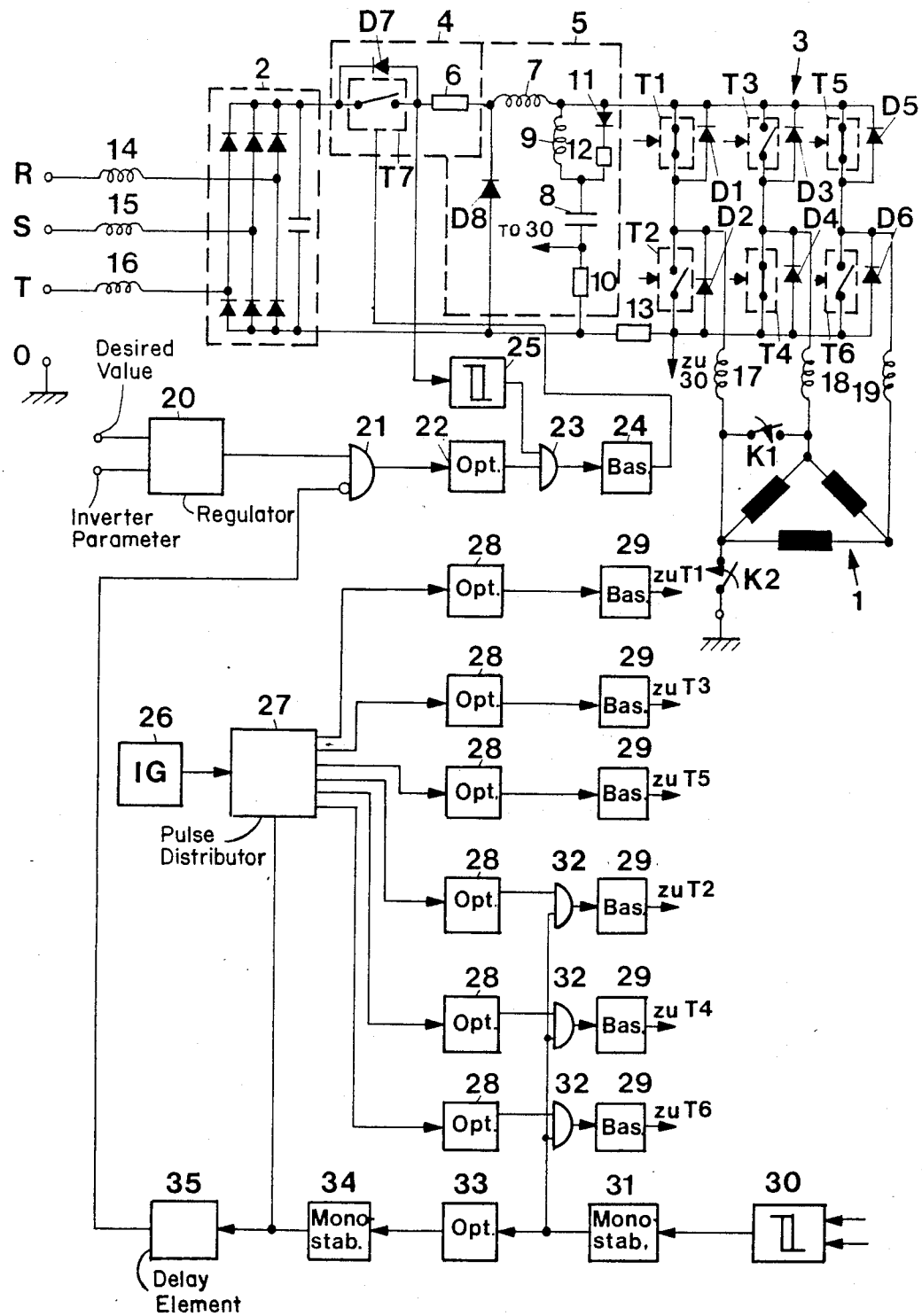

CURRENT SUPPLY APPARATUS FOR AN A.C. CONSUMER

FIELD OF INVENTION

The invention relates to a current supply apparatus for an A.C. consumer, comprising an inverter having transistors and relaxation diodes in bridge circuit, a mains energised rectifier, a transistor chopper between the rectifier and inverter, a smoothing circuit behind the chopper with a smoothing coil and smoothing condenser, one base control circuit for each transistor of the chopper and inverter, a current measuring resistor for the chopper current, a current measuring resistor in the current return line of the inverter, a pulse generator, a pulse distributor feeding the pulses of the pulse generator to the inverter-base control circuits and a regulator feeding control pulses to the chopper-base control circuit depending on an operating parameter of the inverter, a blocking signal being feedable to the base control circuits of the chopper and inverter depending on an overcurrent measuring signal derived from the associated current measuring resistor.

In a known apparatus of this kind, the control portion comprising the regulator, pulse generator and pulse distributor is galvanically connected to the high voltage portion containing the rectifier, chopper and inverter. In this case there is a danger that the high voltage amounting up to 600 volt is transmitted to the control portion and the latter is possibly not safe to touch. The interpositioning of separating transformers between the control portion and the high voltage portion is expensive and increases the switching off delay of the chopper and inverter in the case of an overcurrent because the blocking signals act on the chopper or inverter by way of the regulator or pulse distributor.

Further, in a similar current supply apparatus without a chopper and associated smoothing circuit it is known to protect the inverter transistors by measuring the consumer current in each phase by itself and to switch off all the inverter transistors by way of the control portion of the inverter. In this case, each output phase of the inverter is provided with a current measuring resistor and a further measuring resistor is provided in the inverter current return line. Especially in the case of a more than two-phase inverter, this results in a considerable expenditure for measuring resistors having correspondingly high losses. Galvanic separation between the high voltage and control portion is likewise not provided.

SUMMARY OF THE INVENTION

The invention is based on the problem of providing a current supply apparatus of the aforementioned kind in which galvanic separation between the control portion and high voltage portion is provided and yet there is rapid interruption of an overcurrent, e.g. upon overload, arcing through of two transistors in series, earthing or short-circuiting.

According to the invention, this problem is solved in that the control pulses for the chopper and inverter transistors are fed to the associated base control circuit by way of a respective optocoupler, and that a respective gate feedable with the appropriate blocking signal on overcurrent is disposed between the optocouplers and the base control circuits for the chopper and for the transistors of the inverter that are connected to the current return line of the inverter.

By means of the optocouplers, one obtains galvanic separation between the control portion and high voltage portion in a simple manner so that the control portion is safe to touch. Conventional optocouplers are slow to respond, so that delay periods of about 6 to 10 microseconds could result and within these the transistors could already be destroyed by an overcurrent. By means of the interpositioning of the gates between those optocouplers and base control circuits which are associated with the inverter transistors connected to the inverter current return line on the one hand and the chopper-transistor on the other hand as provided for by the invention, the blocking signal produced for these transistors on overcurrent can bypass the control portion. This gives a very small switching-off delay. Since two inverter transistors are in series in each branch of the bridge, it is basically sufficient for only the inverter transistors connected to the inverter current return line to be switched off (blocked). This reduces the expense for interposed gates.

Preferably, the inverter current measuring signal is fed to a threshold value stage which produces the blocking signal on overcurrent and feeds it by way of a first monostable trigger element to the gates of the inverter transistors connected to the inverter current return line. Since the monostable trigger element triggers back only after a predetermined running time which is longer than the switching-off delay of the inverter, and produces a switching-on signal, one can be sure that the inverter is not switched on again immediately but only after this running time, whereby to avoid the inverter receiving a switching-on signal before it has been completely switched off.

The blocking signal may be feedable from the output of the first monostable trigger element by way of one optocoupler to a second monostable trigger element by which the blocking signal is prolonged and fed to a blocking input of the pulse distributor as well as a gate transmitting the control pulses of the regulator. In this case, simultaneously with delivering a blocking signal to the inverter transistors connected to the inverter current return line, a blocking signal is transmitted to the other inverter transistors as well as to the chopper. The base control circuits can, as usual, ensure a minimum switching-on time and minimum switching-off time for the inverter transistors. Nevertheless, one avoids an excessively high switching-off delay as would be the case in the event of a short-circuit on the input side of the consumer if this short-circuit occurs immediately after commencement of a minimum switching-on period. If only the transistors connected to the inverter current return line were to be blocked, the minimum switching-on period would be added to the inherent switching-off delay of these transistors. On the other hand, if the other transistors are also blocked, that of the other transistors carrying the total current of the transistors in series therewith would not be operated at the minimum switching-on period so that in this case only a relatively short switching-off period is likewise ensured because the delay of the blocking signal in travelling by way of the control portion is less than the minimum switching-on period. After expiry of the running time of the second monostable multivibrator, which could amount to about 0.5 seconds, the inverter is switched on again and, if the cause for the overcurrent has in the meantime disappeared, operation is continued without hindrance.

It is in this case advantageous if there is further delay in switching on the chopper relatively to switching on of the inverter. This is achieved in that a switching on delay element is provided between the second monostable trigger element and the gate transmitting the control pulses of the regulator. If the cause for the overcurrent has not yet been removed upon switching the inverter on again, switching off will again take place. This can be repeated several times, the smoothing condenser possibly being discharged gradually before the chopper is switched on again.

In circuits endangered by the currents, a current limiting coil may be provided which limits the current and ensures that is rate of increase is within the switching-off delay.

Each output line of the inverter may contain a current limiting coil. The latter limits the rate of increase of the current in a case where the consumer is earthed or short-circuited.

The current limiting coils between the inverter and consumer could possibly be omitted if the leads of the rectifier contain appropriately dimensioned interference suppression throttle coils and a current limiting coil is disposed in series with the smoothing condenser. The interference suppression throttle coils are particularly advantageous in the case of earthing on the consumer side. The current limiting coil in series with the smoothing condenser likewise limits the increase in discharge current of the condenser in case of arcing through of two inverter transistors in series by reason of external interference.

In the case of earthing on the consumer side, a high charging current can flow through the smoothing condenser by way of one relaxation diode of the inverter. There should therefore be in series with the smoothing condenser a current measuring resistor which is connected to the current return line of the inverter and the voltage drop of which is likewise fed to the threshold value stage as a further current measuring signal. In this case, earthing on the consumer side leading to an excessively high charging current of the smoothing condenser can be utilised for switching off the inverter even if this earthing current does not flow through the current measuring resistor in the current return line of the inverter. By reason of monitoring of the charging current of the smoothing condenser, the current limiting coils between the inverter and consumer and any interference suppression coils provided on the input side of the rectifier can be designed for a lower saturation current than without such monitoring of the charging current.

The current limiting coil in series with the saturation condenser may be bridged by a series circuit of a diode and an ohmic resistor, the anode of the diode being disposed on the current supply side of the inverter. The energy stored in the current limiting coil during a short-circuit in the inverter by the discharge current of the smoothing condenser can, after the inverter has been switched off, be discharged by way of the series circuit in parallel with the current limiting coil to avoid an overvoltage.

DESCRIPTION OF PREFERRED EMBODIMENT

A preferred example of the invention and its refinements will now be described in more detail with reference to the drawing.

The drawing illustrates a current supply apparatus and a multiphase inductive inverter consumer 1, in this case a three-phase asynchronous motor, energised thereby.

The current supply apparatus contains a three-phase rectifier 2 in bridge circuit which produces a smoothed D.C. voltage and is energised by a three-phase A.C. mains R, S, T with earthed zero point O. Further, it comprises an inverter 3, a chopper 4 between the rectifier 2 and inverter 3 in the current lead to the inverter 3, and a smoothing circuit 5 following the chopper 4.

The inverter 3 comprises six transistors T1 to T6 which are illustrated in simplified form as switches and are each in bridge circuit with an anti-parallel relaxation diode D1 to D6.

The chopper 4 contains a transistor T7 likewise shown in simplified form as a switch, with an anti-parallel connected relaxation diode D7 and a series connected current measuring resistor 6.

The smoothing circuit 5 contains a smoothing coil 7, a smoothing condenser 8, a current limiting coil 9 and ohmic current measuring resistor 10 in series with the smoothing condenser 8 and a relaxation diode D8 for the coil 7 of which the anode is connected to the current return line of the inverter. Further, in parallel with the current limiting coil 9, it comprises a series circuit of a diode 11 and an ohmic resistor 12 limiting the diode current. The anode of diode 11 lies at the current lead of positive potential for the inverter 3 and the current measuring resistor 10 between the smoothing condenser 8 and the current lead at negative potential for the inverter 3.

A further current measuring resistor 13 is provided in the current return line of the inverter 3.

An interference suppression throttle coil 14, 15, 16 is provided in each of the leads to the rectifier 2 and a current limiting coil 17, 18, 19 in each of the output lines of the inverter 3. K1 and K2 represent switches symbolising possible short-circuit paths.

The current supply apparatus also comprises a regulator 20 which compares the existing value of an operating parameter of the inverter 3, namely its operating voltage or operating current, with a desired value and, depending on the comparison, produces control pulses for the chopper 4. These control pulses are fed to the transistor T7 by way of a gate 21, in this case a linking element with INHIBIT function, an optocoupler 22, a gate 23, in this case a linking element with AND function, and a base control circuit 24. The control pulses control the interrupting behaviour of the chopper 4 so that the mean value of the output voltage of the chopper 4 formed by the smoothing circuit 5 is made to approach a value corresponding to the desired value of the operating parameter of the inverter 3.

A current measuring signal tapped from the current measuring resistor 6 is fed to a threshold value stage 25. On the occurrence of an overcurrent, the current measuring signal exceeds the threshold value of the threshold value stage 25. The latter thereupon produces a blocking signal which blocks the gate 23 and thus the transmission of further control pulses to the chopper 4. The chopper 4 assumes the illustrated condition in that it switches off (interrupts) the supply voltage for the inverter 3.

The frequency of the inverter 3 is determined by an impulse generator 26 of which the control pulses are fed by way of a pulse distributor 27, six further optocouplers 28 and six further base control circuits 29 to the bases of the transistors T1 to T6 of the inverter 3 and control the transistors in such a way that they feed the consumer 1 with a three-phase alternating voltage on average approaching a sinusoidal shape, at least three transistors of the inverter which are not in series always being operated (switched on) cyclically in overlapping relationship.

The current measuring signals derived from the current measuring resistors 10 and 13 are fed to a further threshold value stage 30 which produces a blocking signal when one or the other current measuring signals fed to it or both of these exceeds or exceed the threshold value corresponding to an overcurrent, the threshold value stage for a positive and a negative overcurrent signal measured at the resistor 10 in each case comprising a comparator. The blocking signal is fed by way of a monostable trigger element 31 to the one input of gates 32 each disposed between those of the optocouplers 28 and base control circuits 29 which are associated with the inverter transistors T2, T4 and T6 connected to the current return line of the inverter 3. By means of this blocking signal, the gates 32 are blocked so that the transistors T2, T4 and T6 no longer receive control pulses and these transistors are blocked, namely for at least as long as the duration of the blocking signal produced by the monostable trigger element 31, which amounts to about 15 microseconds and is longer than the 5 to 10 microsecond switching-off delay of the inverter including the base control circuits 29.

The blocking signal of the monostable trigger element 31 is also fed by way of an optocoupler 33 and a second monostable trigger element 34 to a blocking input of the pulse distributor 27 which thereupon blocks all the control pulses fed to the transistors T1 to T6 of the inverter 3 so that the inverter 3 is completely switched off. The duration of the control signal produced by the monostable trigger element 34 is longer than the blocking signal produced by the monostable trigger element 31 and amounts to about 0.5 seconds. The output signal of the monostable trigger element 34 is also fed to a blocking input of the gate 21 by way of a delay element 35 which has a time constant of about 0.2 seconds and delays the rear flank of the blocking signal. The gate 21 thereupon blocks the transmission of the control pulses of the regulator 20 to the chopper 4 and thus also blocks the latter.

The base control circuits 24 and 29 ensure that a minimum switching-on and a minimum switching-off period for the transistors T1 to T7 is not undercut.

During operation, a current can flow over different circuits upon earthing (switch K2 closed):
(a) If, for example, the transistor T2 is operated by (switched on): from earth through K2, coil 17, transistor T2, current measuring resistor 13, rectifier 2 and interference suppression throttle coil 16 to the phase T which at this instant has a negative potential with respect to earth. The rate of increase of this short-circuit current is limited by the coils 16 and 17. The current measuring signal tapped from the resistor 13 ensures by way of the threshold value stage 30, the monostable trigger element 31 and the gates 32 switching off of the transistors T2, T4 and T6 over the shortest path (while by-passing the elements 33, 34, 27, 28), so that the short-circuit current is interrupted;
(b) If, for example, the transistor T1 is switched on and, for example, the transistor T2 is switched off: from the positive pole of the rectifier 2, by way of the current supply line of the inverter 3, to the transistor T1 and the coil 17 to earth. This current is not detected by the resistors 10 and 13 but only by the resistor 6. It increases only slowly because of the smoothing coil 7 which has a very high inductivity in comparison with the coils 14 to 19. If it reaches the threshold value of stage 25 before the short-circuit disappears, stage 25 blocks the chopper 4 by way of gate 23 and base control circuit 24 along the shortest path, the chopper thereupon interrupting the current;
(c) If, for example, the transistor T2 is switched off and the intermediate circuit voltage is lower than the voltage between earth and the current return line of the inverter: from earth by way of the current limiting coil 17, the relaxation diode D1, the smoothing condenser 8 and the rectifier 2 to the phase T.

Case (c) is the most critical because it cannot be cured by switching off the inverter 3 or chopper 4. This current is therefore detected by the resistor 10. The voltage drop at the resistor 10 causes switching-off of the chopper 4 and all the transistors T1 to T6 by way of the components 30 to 35 and 21 so that an additional earth current cannot flow by way of an inverter transistor which would be subsequently switched on.

If the transistor T2 is brought to the conductive state by externally acting interference with the transistor T1 switched on, the condenser 8 can discharge through the two transistors T1 and T2. This discharge current is limited by the coil 9 and is interrupted by the overcurrent measuring signal which is derived at the resistor 13 and blocks the transistors T2, T4, T6 directly by way of the elements 30, 31, 32, 29. After interruption, the energy stored in coil 9 discharges over the diode 11 and resistor 12.

The blocking signal of the threshold value stage 30 also blocks the transistors T1, T3, T5 by way of the elements 31, 33, 34 and 27 and also the chopper 4 by way of the elements 35 and 21. Through the delay of the optocouplers 22, 28 and 33, the transistors T1, T3, T5 and the chopper 4 are however switched off by the blocking signal of the threshold value stage 30 somewhat later than are the transistors T2, T4, T6. If, simultaneously, an overcurrent flows through the current measuring resistor 6, however, the chopper 4 is also momentarily switched off by way of the threshold value stage 25.

On the other hand, the transistors T1, T3, T5 and the chopper 4 are, occasioned by the additional time constants of elements 34 and 35, switched on again somewhat later than the transistors T2, T4 and T6, namely the chopper 4 last of all. If an overcurrent is still present on switching on again, switching off takes place once more. These steps are repeated until the overcurrent has been removed.

The longest switching off delay arises if an earth current occurs immediately after switching on one of the transistors T2, T4 and T6. Since the base control circuits 24 and 29 bring about a minimum switching-on and switching-off period, the longest switching-off delay is equal to the sum of the storing and dropping off periods of the transistors T2, T4 and T6 and the minimum switching-on period. Despite this switching-off delay, there is no damage because, with an earth current for example from earth by way of the diode D2 and the transistor T2, at least two of the coils 14 to 19 ensure limiting of the current. An earth current behaviour with the chopper 4 opened (switched-off) is also possible from the positive pole of the rectifier 2 by way of its charging condenser, the current return line of the inverter 3, the resistor 10, the smoothing condenser 8, the coil 9, the conducting transistor T1 and the coil 17 to earth. This current was additionally limited by the coil 9.

Upon short-circuiting of a consumer coil, i.e. for example with the switch K1 closed, the condenser 8 discharges by way of the coil 9 and two inverter transistors, i.e. in the present example by way of the transistors T1 and T4. This discharge current is limited at least by the coil 9 in its rate of increase, is detected by the resistors 10 and 13 and is interrupted. Although in this inverter 3 there are always at least three transistors switched on simultaneously during each half wave of the interlinked rectifier output voltage, it is sufficient to switch off only one, the one carrying the total current. If the current flows in front of the short-circuit (K1 closed) for example (a) by way of the transistors T1, T4 and T5 or (b) by way of the transistors T1, T4 and T6, then it is sufficient in case (a) to switch off (block) the transistor T4 and, in the case (b), to switch off the transistor T1. For case (b), the transistor T6 could, however, have been switched on directly before the occurrence of the short-circuit. Because of the minimum switching-off period provided, which is about 15 microseconds, the transistor T6 would therefore maintain this short-circuit during this period. The longest switching-off delay along this path containing the elements 30, 31, 33, 34, 27, 28 and 29 is, however, only 10 microseconds. Possibly, the transistor T1 would interrupt the short-circuit even earlier by being blocked over the stated path. It is therefore favourable to feed the blocking signal of the threshold value stage 30 not only to the lower transistors T2, T4 and T6 of the inverter bridge but also to the upper transistors T1, T3 and T5.

Since the coils 17 to 19 always co-operate with the interference suppression coils 14 to 16 or the limiting coil 9, the coils 17 to 19 may be omitted if the coils 9 and 14 to 16 are made correspondingly larger. Thus, the inductivity of coils 9 and 14 to 16 would be in the order of 200 to 300 $\mu$H, if the coils 17 to 19 are omitted.

On the other hand, by reason of the automatic quick switching-off, the coils have to be designed to only a lower saturation current compared with the case where short-circuit or earth currents are limited solely by the coils. The coils need to limit the current increase for only a short time until the overcurrent path is interrupted (about 10 microseconds). This means that, until an interruption has taken place by way of any kind of current monitoring, the coils must not go to saturation because they will then no longer have a limiting effect. Without current monitoring, the coils would have to be very large to avoid a current rise to a very high value. In the present case, however, they need to delay any dangerous current rise only until switching-off has taken place.

The two time elements 34 and 35 serve to switch the inverter 3 and chopper 4 on again automatically after switching-off on an error. After the inverter transistors are blocked, there is no longer an overcurrent the monostable trigger element 31 delivers a switching-on signal at the end of its running time (of about 15 microsec) and, after about 0.5 seconds, the monostable trigger element 34 likewise delivers a switching-on signal so that the inverter is switched on again. If there is still no overcurrent (e.g. short-circuit), after a further 0.2 seconds or thereabouts the chopper 4 is switched on again by way of the delay element 35. If the error remains, the residual voltage of the smoothing condenser 8 after switching-off the chopper 4 is sufficiently high to bring about a short-circuit current which is so large that the entire inverter 3 is switched off again. This is repeated until the voltage at the smoothing condenser has dropped to such an extent that the current occurring on switching-on of the inverter 3 no longer causes switching-off to take place. The inverter then remains switched on and, after about 0.2 seconds, the chopper 4 is operated again. Thereafter, the smoothing condenser 8 is recharged over the throttle coil 7. As soon as the voltage at the smoothing condenser 8 is sufficient to produce a short-circuit current again, the inverter 3 and chopper 4 are switched off again. This can be repeated several times.

Without the switching-on delay for the chopper 4, the latter would charge the throttle coil 7 upon each switching-off of the inverter because of a short-circuit. The throttle coil 7 would then have to be discharged again each time. This repeated discharging of the throttle coil would bring about an increased voltage at the smoothing condenser because the energy supply from the throttle coil 7 is larger than the energy consumption by the short-circuit. After several switchings-off, the semi-conductor elements of the inverter would be endangered by an overvoltage.

We claim:

1. A current supply apparatus for an A.C. consumer, comprising, an inverter having a bridge circuit comprising, transistors and relaxation diodes, a rectifier, a transistor chopper between said rectifier and said inverter, a smoothing circuit behind said chopper having a smoothing coil and a smoothing capacitor, base control circuit means respectively for said chopper transistor and said inverter transistors, a first current measuring resistor behind said chopper, a second current measuring resistor in the current return line of said inverter, a pulse generator, a pulse distributor feeding pulses of said pulse generator to said inverter base control circuits, a current regulator feeding control pulses to said chopper base control circuit responsive to an operating parameter of said inverter, means for feeding a blocking signal to said base control circuits of said chopper and said inverter depending on overcurrent measuring signals derived from said first and second current measuring resistor, respective optocoupler means for feeding said control pulses to said chopper and inverter transistor base control circuits, and respective gate means between those of said base circuits and those of said optocoupler means which are associated with said chopper and with said transistors connected to said return line of said inverter, said gate means being feedable with appropriate blocking signals responsive to overcurrent signals detected by said current measuring resistors.

2. Apparatus according to claim 1 including a threshold value stage and a first monostable trigger element connected thereto and to said transistors connected to said inverter current return line, said inverter current measuring signal being fed to said threshold value stage which produces a blocking signal on overcurrent and feeds it by way of said first monostable trigger element to said gates of said inverter transistors connected to said inverter current return line.

3. Apparatus according to claim 2 including a gate device between said current regulator and said optocoupler means associated with said chopper base control circuit, a second monostable trigger element and an optocoupler device connected thereto and to said first monostable trigger element, a delay element connected to said second monostable element, a second blocking signal being feedable from the outlet of said first monostable trigger element by way of said optocoupler device to said second monostable trigger element and to said pulse distributor, said second blocking signal also being prolonged by said delay element to said gate device which transmits the control pulses of said current regulator.

* * * * *